United States Patent
von Volkmann et al.

(10) Patent No.: US 11,808,685 B2
(45) Date of Patent: Nov. 7, 2023

(54) DEVICE FOR GENERATING LIGHT PULSES FOR CHARACTERIZATION, STANDARDIZATION OR CALIBRATION OF PHOTODETECTORS IN FLOW CYTOMETERS

(71) Applicant: APE Angewandte Physik & Elektronik GmbH, Berlin (DE)

(72) Inventors: Konrad von Volkmann, Berlin (DE); Jan Popien, Berlin (DE); Frank Reuter, Berlin (DE)

(73) Assignee: APE Angewandte Physik & Elektronik GmbH, Berlin (DE)

( * ) Notice: Subject to any disclaimer, the term of this patent is extended or adjusted under 35 U.S.C. 154(b) by 416 days.

(21) Appl. No.: 17/100,057

(22) Filed: Nov. 20, 2020

(65) Prior Publication Data

US 2021/0156786 A1    May 27, 2021

(30) Foreign Application Priority Data

Nov. 22, 2019    (EP) .................................... 19210901

(51) Int. Cl.
*G01N 15/10*    (2006.01)
*H05B 45/32*    (2020.01)
(Continued)

(52) U.S. Cl.
CPC ............ *G01N 15/1012* (2013.01); *G01J 1/08* (2013.01); *G01N 15/1434* (2013.01);
(Continued)

(58) Field of Classification Search
CPC ........... G01N 15/1012; G01N 15/1434; G01N 2201/0612; G01N 2201/062;
(Continued)

(56) References Cited

U.S. PATENT DOCUMENTS 9,851,303 B2 * 12/2017 Huber ................ G01N 21/6456
2004/0052076 A1 * 3/2004 Mueller .............. F21V 23/0442
362/293
(Continued)

FOREIGN PATENT DOCUMENTS

EP    2 464 200 A1    6/2012

OTHER PUBLICATIONS

Extended European Search Report for European Application No. 19210901.5, dated May 25, 2020.
(Continued)

*Primary Examiner* — Jennifer D Bennett
*Assistant Examiner* — Erin R Garber
(74) *Attorney, Agent, or Firm* — Wolf, Greenfield & Sacks, P.C.

(57) ABSTRACT

A device for generating light pulses for characterization, standardization and/or calibration of photodetectors, preferably within a flow cytometer or microscope is disclosed. The device includes emission light sources which are driven with predetermined waveform to emit light pulses. A feedback mechanism based on the provision of separate, series-connected control light sources whose emission is detected by a feedback detector is included. The device may include one or more emission groups of circularly arranged, multi-color emission light sources. To provide different intensity levels, the emission light sources or emission groups can be coupled into a light guide with different efficiencies. Uses of the device and systems or kits including the device is also provided.

16 Claims, 4 Drawing Sheets

(51) Int. Cl.
| | |
|---|---|
| *H05B 45/12* | (2020.01) |
| *G01N 15/14* | (2006.01) |
| *G02B 6/42* | (2006.01) |
| *G01J 1/08* | (2006.01) |
| *G01J 1/42* | (2006.01) |

(52) U.S. Cl.
CPC ............ *G02B 6/4298* (2013.01); *H05B 45/12* (2020.01); *H05B 45/32* (2020.01); *G01J 1/4257* (2013.01); *G01J 2001/4238* (2013.01); *G01J 2001/4242* (2013.01); *G01J 2001/4252* (2013.01)

(58) Field of Classification Search
CPC ....... G01N 2015/1006; G01N 2201/08; G02B 6/4298; G02B 6/262; G02B 6/25; H05B 45/12; H05B 45/32; H05B 47/105; H05B 45/10; H05B 45/22; H05B 47/10; G01J 1/08; G01J 2001/4238; G01J 2001/4252; G01J 2001/4242; G01J 1/4257
See application file for complete search history.

(56) References Cited

U.S. PATENT DOCUMENTS

| | | | |
|---|---|---|---|
| 2006/0022214 A1* | 2/2006 | Morgan | H05B 45/40 257/E25.032 |
| 2009/0057534 A1 | 3/2009 | Liu et al. | |
| 2011/0278456 A1* | 11/2011 | Kiyose | G06F 3/0304 250/206.1 |
| 2015/0098244 A1 | 4/2015 | He | |
| 2020/0150022 A1* | 5/2020 | Ugawa | C12M 1/34 |

OTHER PUBLICATIONS

Giesecke et al., Determination of background, signal-to-noise, and dynamic range of a flow cytometer: A novel practical method for instrument characterization and standardization. Cytometry Part A. Nov. 2017;91(11):1104-14.

* cited by examiner

DEVICE FOR GENERATING LIGHT PULSES FOR CHARACTERIZATION, STANDARDIZATION OR CALIBRATION OF PHOTODETECTORS IN FLOW CYTOMETERS

RELATED APPLICATIONS

Foreign priority benefits are claimed under 35 U.S.C. § 119(a)-(d) or 35 U.S.C. § 365(b) of European application number 19210901.5, filed Nov. 22, 2019. The entire content of which is incorporated herein by reference in its entirety.

FIELD

The invention relates to a device for generating light pulses for characterization, standardization and/or calibration of photodetectors, preferably within a flow cytometer or microscope. To this end, the device comprises emission light sources which are driven with a predetermined waveform to emit light pulses. The device is characterized by a feedback mechanism based on the provision of separate, series-connected control light sources whose emission is detected by a feedback detector. In preferred embodiments, the device comprises one or more emission groups of circularly arranged, multi-color emission light sources. To provide different intensity levels, the emission light sources or emission groups can be coupled into a light guide with different efficiencies. In further aspects, the invention further relates to uses of the device and systems or kits comprising the device.

BACKGROUND

Flow cytometry involves the analysis of optical signals generated by suspensions of particles or biological cells passing through a focused light beam in a fluid stream. The optical signals emitted by the particles are converted into voltage and time pulse signals by the operation of a detector, such as a photodiode or photomultiplier, and analyzed.

Modern cytometers allow the simultaneous multiparametric analysis of physical and biological properties of thousands of particles or cells per second. Flow cytometry is therefore routinely used in basic research to study populations of biological cells that may exhibit heterogeneity of cell type or gene/protein expression. In the clinic, flow cytometry is also used for routine diagnostics in hematology, infectious diseases, and immunology, among others, and also has many other applications in research and clinical practice. For example, a fluorescently activated cell sorting (FACS) flow cytometer can be used to sort cells according to desired characteristics using appropriate fluorescent markers. The quality of the data obtained from a flow cytometry experiment depends not only on the sample preparation, but also on the characterization and calibration of the instrumental components.

In order to meet the highest data quality requirements, the influence of instrument parameters such as laser alignment, fluid stability or configuration of the optics as well as photodetectors should therefore be detected and optimized. In modern flow cytometers, the optical configuration (e.g. setting of filters and dichroic mirrors) and the gain of the detectors (especially PMTs) are adjusted to the requirements of the experiment.

Practice shows that the PMT gain is often selected outside the optimal range, resulting in quality losses.

From a technical point of view, two parameters are important to understand how the optimal use of a PMT depends on the setting of the PMT gain, which is controlled by the voltage. The first parameter is the signal-to-noise ratio (SNR), a measure that compares the level of a desired signal to the level of a background signal. The second parameter is dynamic detection range (DNR), a measure that compares the level of the minimum detectable signal and the maximum detectable signal. Both parameters are crucial for setting the PMT voltage or gain to an optimal operating point and thus to the highest sensitivity.

For flow cytometers, the sensitivity of the instrument is generally captured by its ability to detect a (minimal) light signal (e.g., from fluorescent cells) as opposed to background noise, or to resolve different light signals (e.g., from different cell populations) among themselves.

In the prior art, various experimental approaches are known to characterize the sensitivity of a flow cytometer based on PMT voltage. For example, quality control programs are routinely implemented in commercial flow cytometers for this purpose, (e.g. Cytometer Setup and Tracking (CS&T) in Becton Dickinson (BD, San Jose, Calif.) FACS-Diva software).

The known quality control methods are based on the use of beads and depend on the properties of the beads. The selection of PMT voltages is therefore influenced by intrinsic bead properties (e.g. size variations), which differ from actual biological cells to be measured.

The known bead-based methods are additionally influenced by the laser alignment, the background noise of the lasers or electronics, and the signal processing. Therefore, the PMT voltage optimized based on these methods does not reflect the optimal utilization of the PMT itself, but is influenced by external factors. A reliable optimization for the actual experimental requirements is not achieved.

The influence of the selected PMT voltage on the experimental results is difficult to predict. The DNR of a given PMT is often insufficient to represent all events of interest at scale. As a result, the PMT voltage must be reduced, which may lead to a lower SNR.

Therefore, in the prior art, there efforts exist to provide means or methods to determine the DNR and SNR of PMTs of flow cytometers as a function of PMT voltage and to optimize the DNR or SNR based on the measurement results.

An elegant approach to this end based on the physical detection principle of PMTs had already been proposed by Harald Steen in 1992 (H. Steen Cytometry 13:822-830, 1992).

PMTs use the operating principle of an external photoelectric effect. A primary photoelectron generated by a photon incident on the photocathode is amplified by applying a voltage. As a result, the PMT generates a current which is proportional to the number of photons detected. Both the primary emission process and electron multiplication statistically follow a Poisson distribution. As Steen demonstrated in 1992, these properties can be used to quantify the absolute number of photoelectrons ($N_{PE}$) produced at a PMT photocathode.

Herein, $N_{PE}=1/CV^2$, where CV denotes the coefficient of variation of the incident photons. In the operating range, the number of photoelectrons ($N_{PE}$) is independent of the PMT voltage and depends solely on the incident photons. Consequently, the operating point can in principle be determined by applying a stable input light signal to the flow cytometer and evaluating the detected $N_{PE}$ over different PMT voltages.

Giesecke et al. 2017 disclose corresponding measurement methods based on a precision LED light pulse source, which is commercially available under the name quantiFlash®. In order to determine the optimal operating point of the PMTs, SNR and DNR curves are generated and evaluated over a PMT voltage range from 400 V to 1,000 V.

The possibility of determining SNR and DSR based on the statistical principles described above depends essentially on the stability and precise calibration of the light sources that generate the light pulses for quantification purposes. The well-known quantiFlash® excels in this respect by providing extremely stable light pulses with CVs of less than <0.1%. The device comprises a series of intensity calibrated LEDs in combination with fixed optical attenuators, which provide a DNR of 0 . . . −96 dB with respect to the outgoing light power.

A programmable digital waveform generator provides the pulse shape for each LED and allows the setting of different pulse shapes depending on the intended measurement protocol. To maintain the required precise control of the pulse shape, a light feedback loop is implemented, which in interaction establishes a strictly linear correlation of the outgoing light power on the control signal.

The light feedback loop is based on a feedback photodiode, which is set up to continuously measure the light emitted by the LEDs and convert it into an electrical feedback signal. By means of a control circuit, for example comprising a transimpedance amplifier, the current supply to the LED can be tracked with high precision (cf. FIG. 2A). Such tracking is necessary because LEDs have an intrinsically delayed response with respect to the control signal. In addition, LEDs are strongly nonlinear devices. To ensure a defined and freely adjustable shape of the light pulse, feedback control is essential. Without light feedback loops, steep edges in particular, as in the case of a rectangular pulse, or mathematically exact pulse shapes in Gaussian form could not be adequately reproduced.

In order to cover a high dynamic range (i.e. a wide intensity range for the light pulses), three identical LEDs are provided, which couple into the output fiber with different effectiveness based on their relative positioning to the output fiber (see FIG. 2B). The emission LED, which is close to the output fiber, is coupled into the output fiber with the highest effectiveness and can cover a range of high pulse intensities. In contrast, the LED positioned further away from the output fiber couples into the output fiber with reduced effectiveness, corresponding to a low intensity level.

Positioning the LEDs at different distances from the output fiber thus allows different intensity levels to be set. While each of the LEDs is always operated in its working range, a high dynamic range can be reliably achieved.

The feedback diode is preferably positioned such that the light from each of the three LEDs emits at least partially onto the feedback diode.

While the known device is characterized by high-precision control and wide dynamic range, there is still potential for improvement.

On the one hand, the different fiber distances of the LEDs inevitably also cause a different spacing to the feedback diode, so that individual feedback settings are required for each of the three LEDs and the effort is increased. Furthermore, by means of the known arrangement of the feedback diode, a compromise is necessary between an optimal coupling of the respective emission LED into the output fiber and an effective alignment to the feedback diode. Furthermore, an extension to different colors with several intensity levels would be with the known devices only possible with a high effort.

In the prior art, the skilled person finds only insufficient suggestions for improvement, even with recourse to more remote technical fields.

US 2009/057534 A1 discloses the provision of an LED array for the backlight of an LCD display. To regulate the intensity of the LEDs, US 2009/057534 A1 proposes to assign light detectors to each of the LEDs. Based on the measured data, a control unit separately regulates the brightness of the LED by adapting the shunt control signals. In contrast to known LED arrays of the prior art, this is intended to enable a more homogeneous illumination.

US 2015/098244 A1 also relates to a use of multiple LEDs for the backlight of a TFT LCD display. The LEDs are provided as a side-type backlight. According to US 2015/098244 A1, it is preferred to couple the LEDs laterally into a light guide with an emission surface so that the point-type LED light sources are converted into a line of light for a backlighting.

Controlled provision of light pulses with a predetermined temporal waveforms, for example a Gaussian shape or a flat-top pulse shape, is not provided in either US 2009/057534 A1 or US 2015/098244 A1. Similarly, no temporal tracking of a predetermined signal shape for light pulses by means of a feedback regulation is proposed.

EP 2 464 200 A1 describes a dimmable light source comprising several LEDs. A single light detector is located close to the LEDs and is intended to allow more precise adjustment of brightness by appropriate feedback regulation. EP 2 464 200 A1 thus proposes a control of multiple emission LEDs connected in series by means of a single sensor, which detects the light from the emitting LEDs and is intended to enable brightness adjustment for all LEDs based on the measurement. A separate feedback regulation of the brightness of individual LEDs is not enabled.

Furthermore, EP 2 464 200 A1 also does not provide for the generation of light pulses with a predetermined waveform, nor does it disclose feedback regulation for a temporal adjustment of an electrical control signal to ensure the predetermined waveform or signal shape.

SUMMARY

A device for generating light pulses for characterization, standardization and/or calibration of photodetectors, which does not exhibit the disadvantages of the prior art. In particular, it was an objective of the invention to develop a device for generating light pulses, which is characterized by a highly precise control of the light pulses and allows for both a high dynamic range and scalability (including to a plurality of colors) by means of a simple, compact design.

BRIEF DESCRIPTION OF THE FIGURES

In the following, the invention will be explained in more detail by means of examples and figures, without intending to be limiting.

DETAILED DESCRIPTION

In one embodiment, the invention relates to a device for generating light pulses for characterization, standardization and/or calibration of photodetectors, preferably within a flow cytometer or microscope, comprising
- a) a control unit
- b) at least one emission light source and
- c) a light guide,
   wherein the control unit is configured to generate an electrical signal with a predetermined waveform by means of which the at least one emission light source is controlled for generating light pulses and the at least one emission light source is positioned for coupling the light pulses into the light guide, the device comprises at least one feedback detector and a control light source, wherein the control light source is connected in series with the at least one emission light source, so that the control light source is controlled by means of the electrical signal with the same predetermined signal form for generating light pulses, and wherein the control light source is positioned in such a way that the light pulses actually generated by the control light source are not coupled into the light guide, but are detected by the feedback detector and transmitted to a regulating unit which is configured for readjustment of the electrical signal.

The device according to the invention is characterized by the provision of a control light source associated with each emission light source, the emission of which is detected by a feedback detector. The proposed solution thus represents a departure from known light feedback loops, which aim to directly detect the light of an emission light source. Instead, a separate control light source is used, whereby the intended series connection ensures synchronous behavior. In particular, the temporal course of the emission signal of the control light source is delayed analogously to the emission light source with respect to the predefined waveform (signal form).

Advantageously, a control of the electrical signal by means of the control light source thus also leads to a precise control of the desired emission signal of the emission light source. Preferably, the respective pair of control light source and emission light source are light sources with essentially identical operating characteristics. In particular, the temporal emission behavior with respect to a current change should be as similar as possible. This condition can be easily fulfilled by preferably using identical light sources, e.g. LEDs with identical operating parameters, as control and emission light sources according to the manufacturer's specifications. Any deviations could also be compensated by means of an appropriate calibration.

The spatial separation of emission and control light source leads to increased design flexibility and thus to a number of advantages.

On the one hand, even when several emission light sources are used (e.g., to provide different intensity levels), optimal illumination of the feedback diode by the control light sources may always be ensured.

While the emission light sources are at different distances from the light guide, this is not necessary for the control light sources. Instead, the control light sources can be arranged more compactly so that all control light sources irradiate optimally the feedback detector.

The possibility of a compact arrangement also means that different feedback settings for individual emission light sources are dispensable. Instead, the same feedback setting may be used for each emission light source or each pair of emission and control light sources. Effort is reduced.

Another advantage of providing a separate control mechanism based on a control light source relates to the simplified scalability. The duplication allows to arrange both the emission light sources with respect to the light guide and the control light sources with respect to the feedback detector independently of each other in an extremely compact way.

In contrast to known solutions, an extension to several colors (e.g. 6 or more) with different intensity levels at the same time is thus achieved in a simple way.

The use of a separate control light source for feedback regulation of an emission light source represents a departure from known approaches, for which the skilled person receives no suggestions in the prior art. For example, in EP 2 464 200 A1 it is proposed to arrange a light detector close to the emission LEDs in order to control the brightness by means of a feedback regulation. However, in EP 2 464 200 A1 all emission light sources contribute to the feedback signal. Provision of a separate control light source is neither disclosed nor suggested for the dimmable light source of EP 2 464 200 A1. As described herein, such separate control in the context of a device according to the invention for providing dynamically controllable light pulses leads to a number of advantages. The device according to the invention is characterized not only by an increased degree of precision for generating the light pulses with the desired waveform (signal shape), but also by the possibility of realizing a plurality of colors and/or intensity levels in a compact manner. The device provided according to the invention thus allows a significantly more comprehensive characterization, standardization and/or calibration of photodetectors, in particular of a flow cytometer, than was the case for known devices in the prior art.

For the purposes of the invention, the term "light source" preferably refers to a component which emits electromagnetic radiation or light as a function of an applied electric current. The term "light" preferably refers to the entire electromagnetic spectrum from the ultraviolet range (UV-A to UV-C: 100 nm to 380 nm, preferably UV A and UV B: 280 nm to 380 nm) through the visible range (380 nm to 780 nm) to the infrared range (780 nm to 1 mm, preferably near infrared (NIR) 780 nm to 1.4 µm, shortwavelength infrared (SWIR): 780 nm to 3 µm).

A large number of current-operated light sources are known in the state of the art. Light-emitting diodes (LEDs) are particularly preferred light sources.

In a preferred embodiment, the device is characterized in that the at least one emission light source and the at least one control light source are light emitting diodes (LEDs).

LEDs are preferably light-emitting semiconductor components whose electrical properties correspond to a diode. If electric current flows through the LED in the forward direction, electromagnetic radiation is emitted. The wavelength can be adjusted by the semiconductor material used or the doping. Due to their small size, fast current emission dynamics and the available range of colors, LEDs are particularly suitable for generating light pulses in the device described herein.

The emission and control light sources are preferably available as light sources of identical design, for example as LEDs with identical operating parameters, whereby emission and control light sources differ on the basis of their function within the device.

While emission light sources are positioned or configured for coupling into the light guide, control light sources radiate onto a feedback detector.

Light guides are preferably transparent components, such as fibers, tubes or rods, which can conduct or guide light over short or long distances. Particularly preferably, the light guide may be an optical waveguide comprising one or more fibers formed, for example, of quartz glass or polymers and capable of guiding light. For this purpose, optical waveguides preferably comprise a cladding with a refractive index lower than that of the core to allow for total reflection. Optical fibers are used in various technical fields, with communications technology being one of the most widespread. Synonymously related terms are fiber, optic cable or optical fiber.

However, it is also common to use optical fibers in optical instruments to guide the emission of a light source to desired points of incidence, independent of the position. In the context of the described device for characterization, standardization and/or calibration of photodetectors, the coupling of the radiation emitted by the emission light source into a light guide, allows a simple and low distortion forwarding of the light pulses to the photodetectors to be characterized. Typically, these are located within a flow cytometer or microscope. Preferably, therefore, the light guide may further comprise a connection to a flow cytometer or microscope.

The emission light source thus serves to generate those light pulses which the device provides for calibration purposes. The accuracy of the characterization, standardization and/or calibration of the photodetectors is preferably supported by the particular precise generation of said light pulses. Here, the time course of the intensity of the emitted light pulses preferably exhibits a particularly high correspondence with a predetermined waveform or signal shape. By using statistical laws, the generated light pulses can be used to characterize the dynamic range (DNR) or the signal-to-noise ratio (SNR) of the photodetectors (cf. Steen 1992).

For predetermining and controlling the light pulses to be generated, the device comprises a control unit which generates an electrical signal for feeding into the emission light source on the basis of a predetermined waveform or signal shape. A predetermined waveform or signal shape preferably means a predetermined time course for the intensity of the light pulses to be generated, for example with a Gaussian or "flat-top" pulse shape. Preferably, the control unit may comprise two conceptual components. First, a unit for providing a desired waveform of the pulses (e.g., based on a user input). On the other hand, a component which converts the desired waveform into an electrical (current) signal which is fed into the light sources In a preferred embodiment of the invention, the control unit comprises a data processing unit, preferably a microprocessor, and a function generator, preferably an arbitrary function generator.

In the sense of the invention, a data processing unit preferably means a unit which is suitable and configured for receiving, transmitting, storing and/or processing data, preferably with respect to the specification of a waveform or signal form. The data processing unit preferably comprises an integrated circuit, a processor, a processor chip, microprocessor or microcontroller for processing data, and optionally a data memory, for example a hard disk, a random access memory (RAM), a read-only memory (ROM) or also a flash memory for storing the data.

Especially preferred, the data processing unit comprises a microprocessor, i.e. a processor which is characterized by small dimensions in the range of a few mm and wherein preferably all components of the processor are present on a microchip or integrated circuit (IC). The microprocessor can preferably also be a microcontroller which, in addition to the processor, integrates further peripheral elements on the microchip and comprises, for example, a data memory.

The data processing unit preferably provides information of a desired waveform for the light pulses to a function generator, which is arranged to generate a corresponding electrical waveform or signal form.

For the purposes of the invention, a function generator refers to a device or electrical component for generating electrical signals with different waveforms or signal shapes. These may include periodic signals as well as arbitrary, non-periodic signals. In the prior art, analog and digital function generators are known, for example. Typical digital function generators for generating periodic waveforms (e.g., sine, square, triangle, or sawtooth waveforms) use direct digital synthesis for this purpose. The accuracy of digital function generators is significantly higher than that of analog circuit technology. A quartz oscillator can serve as clock source.

In a particularly preferred embodiment, the function generator is an arbitrary waveform generator, which may be referred to synonymously as an arbitrary waveform generator, AWG. An arbitrary waveform generator is a function generator that can generate arbitrarily shaped output signals, especially periodic, such as non-periodic signals. Typical arbitrary waveform generators also operate on the principle of direct digital synthesis. For this purpose, the desired signal shape can be stored in a semiconductor memory whose memory locations are cyclically retrieved by a frequency-variable address generator. A digital-to-analog converter with subsequent low-pass filter and output amplifier generates the electrical output signal from the numerical values.

Stand-alone devices of the state of the art usually include a data processing unit, for example a central microprocessor, which performs the functions of the function generator and a presetting of waveforms or their characteristic parameters on the basis of user inputs.

For the purposes of the present description, the function generator preferably refers to those components of the control unit which have a data processing unit, such as a microprocessor, connected downstream for processing user inputs.

In a preferred embodiment of the invention, the device is characterized in that the control unit comprises input means for defining parameters of the light pulses to be generated and the data processing unit is configured to control the function generator for generating the electrical signal based on the predetermined parameters.

Suitable input devices are user interfaces that enable the user to enter parameters. These include, for example, keyboards, touchpads, a computer mouse or simple operating elements such as pushbuttons, rotary switches, rocker switches with corresponding assignment to the desired parameters.

The parameters preferably characterize the light pulses to be generated or electrical pulses specified for this purpose.

For example, a parameter may specify a type of pulse shape, which may be, for example, a Gaussian shape, a rectangular shape, a triangular shape, or a "flat-top" pulse shape. Preferably, the pulse shape denotes the temporal variation, i.e., a function of light intensity or electrical signal as a function of time.

A pulse in Gaussian form will therefore show a time course of a Gaussian curve. In analogy to the statistical meaning of the Gaussian distribution, the width is defined by a standard deviation. A "flat-top" or flattened pulse shape characterizes pulses with an essentially constant height over a certain period of time. Instead of a pulse maximum, flat-top pulses exhibit a maximum plateau over a substantial duration of the pulse.

In another preferred embodiment, a parameter for specifying the light pulses to be generated is the pulse width. The pulse width can preferably be defined as a Full Width at Half Maximum (FWHM), independent of the type of pulse shape. As well known, the Full Width at Half Maximum denotes the difference between the two argument values for which the function values have dropped to half of the maximum. In other words, the Full Width at Half Maximum corresponds to the width of the function at "half height". For example, in the case of a pulse with a Gaussian shape, the FWHM is approximately 2.3548 times the standard deviation. Preferred pulse widths are in the range of 0.1 µs to 100 µs, especially preferably from 1 µs to 10 µs.

In another preferred embodiment, a parameter for specifying the light pulses to be generated is the pulse height or amplitude. For example, an intensity value can be specified for the amplitude of the pulses to be emitted. To ensure appropriate amplitudes of the light pulses, the amplitude of the electrical pulses can be adjusted. That is, the maximum current intensity is increased or decreased depending on a higher or lower light intensity to be set. In addition, the parameter for achieving a predefined intensity of the light pulses can also require the selective control of different emission light sources, which, as described, couple into the light guide with different efficiencies.

In another preferred embodiment, a parameter for specifying the light pulses to be generated is the repetition rate. For use of the device for characterization, standardization or calibration of photodetectors, it is preferred to generate a series of pulses with a stable pulse shape in regular repetition. The repetition rate indicates the frequency of the light pulses to be generated and in preferred embodiments is between 0.1 and 100 kHz, particularly preferably between 0.5 kHz and 40 kHz.

The parameters for specifying the light pulses to be generated can, on the one hand, be defined by a user using corresponding input means. On the other hand, it may also be preferable to define the parameters on a device-specific basis.

The control unit, or preferably a data processing unit located on it, is preferably configured to read the input parameters or device-specific parameters. On the basis of the parameters and, if necessary, further calibration data, the data processing unit, preferably the microprocessor, compiles information about a predetermined waveform or signal form, which is passed on to the function generator. Based on these, the function generator generates an electrical signal, which preferably comprises electrical pulses that are set up to generate the desired light pulses.

Some parameters, such as the pulse shape or pulse width, may mutually correspond to each other. In other words the parameters for the electrical pulses are the same as the parameters for the desired light pulses. For other parameters, such as an amplitude or pulse height, conversion data can be stored.

In a preferred embodiment of the invention, the predetermined waveform comprises electrical pulses having a Gaussian shape or a flat-top pulse shape, such that preferably the light pulses to be generated are also in Gaussian shape or a flat-top pulse shape. In further embodiments, double or triple pulses can also be generated, which have two or three maxima in a pulse shape. Such pulse shapes can, for example, simulate the detection of double or triplet cells in flow cytometers.

In a preferred embodiment of the invention, the predetermined waveform comprises electrical pulses having a pulse width of from 0.1 µs to 100 µs, preferably from 1 µs to 10 µs, and a repetition rate of from 0.1 to 100 kHz, preferably 0.5 kHz to 40 kHz, such that the generated light pulses preferably equally have a pulse width of from 0.1 µs to 100 µs, preferably from 1 µs to 10 µs, and a repetition rate of from 0.1 to 100 kHz, preferably 0.5 kHz to 40 kHz.

Experience shows that the aforementioned pulse widths and repetition rates, especially for pulses in Gaussian form or as flat-top pulses, are particularly suitable for using the device for characterization, standardization and/or calibration of photodetectors in flow cytometers or microscopes.

By means of the aforementioned components, a precise generation of a given waveform or signal form of electrical pulses is thus possible. Without a feedback control, however, a 1:1 translation of the electrical pulse shapes into light pulses cannot take place. Rather, a current-driven light source, such as an LED, will exhibit delayed temporal behavior relative to the driving electrical signal. For example, the dynamic modulation behavior of current-driven light sources, such as LEDs, is limited by the lifetime of spontaneous emission. Thus, a steep decaying edge of an electrical pulse will not result in an equally steep decay of the emission intensity of the LED. Rather, sustained spontaneous emission causes a delayed decay and results in a flattened pulse edge. Likewise, a delayed emission response or flattened slope is to be expected on the rising side when driving an LED with an electrical pulse.

The physical emission principles thus imply a non-linear transfer function or correlation between an incoming electrical pulse and a light pulse emitted in response. In principle, it is conceivable to take the non-linear light-current correlation into account when generating the electrical pulse signals. On the one hand, a calibration necessary to this end is costly. On the other hand, aging processes of the light sources lead to a change of the non-linear correlation, which would not be detected.

Instead, an electronic feedback control is implemented according to the invention. For this purpose, the device comprises a feedback detector, which can preferably be a photodetector, i.e. a detector for quantifying light. The detection spectrum is preferably matched to the spectrum of the control light source. The feedback detector for measuring the control light source is not bound to a specific type. For example, photocells, photomulitpliers (PMTs), CMOS sensors, CCD sensors, photodiodes, avalanche photodiodes or pin photodiodes can be used to this end.

In a particularly preferred embodiment, the feedback detector is a photodiode.

A photodiode is preferably a semiconductor diode which converts light at a p-n junction or pin junction into an electric current by the internal photoelectric effect. Depending on the semiconductor material used or its doping, the detection spectrum of the feedback photodiode can be specified and adapted to the emission spectrum of the control light source. A photodiode as feedback detector is characterized by a compact design as well as high dynamics to monitor the emission of the control light source.

Since the control and emission light sources are connected in series, they are driven to emit light by means of the identical electrical signal. According to the invention, it was recognized that the emission dynamics of identical pairs of control and emission light sources are surprisingly similar. The electrical feedback signal provided by the feedback detector thus allows conclusions to be drawn about the emission behavior of the emission light source directly and with high accuracy. A positioning of a detector in the vicinity of the emission light source is not necessary.

To readjust the electrical signal based on the emission response measured by the feedback detector, the device includes a regulating unit.

Preferably, the regulating unit is formed by an electrical circuit that compares a set or target signal and feedback signal and regulates the current through control and emission sources such that the difference between the two signals is zero. The target signal preferably corresponds to the electrical signal provided by the function generator, which feeds the emission and control light sources. The feed is not instantaneous.

Instead, the electrical signal generated by the function generator is connected to a regulating unit, which also exhibits an input for the signal from the feedback detector. The regulating unit is configured in such a way that the electrical signal coming out of the regulating unit is modified so that the difference between the set or target signal coming in from the function generator and the feedback signal measured by the feedback detector is zero. As explained above, the emission behavior of the control light source is identical or nearly identical to the emission behavior of the emission light source. The regulating unit thus readjusts or tracks the "actual signal" of the emission light source almost perfectly to the set (target) signal of the function generator. The light pulses emitted by the emission light source preferably correspond almost exactly to the electrical pulses provided by the function generator in terms of pulse shape and time course. By controlling the current supply to the light sources by means of the feedback control, a close correlation of the temporal intensity course of the emitted light pulses with the specified waveform is thus preferably ensured.

The feedback control according to the invention allows for a particularly precise temporal adjustment or tracking of the light pulses of the emission light sources to the desired set signal. In this respect, the dynamic feedback regulation clearly goes beyond a simple adjustment of the brightness of LEDs based on a feedback detector, which is proposed for example in US 2009/057534 A1 or EP 2 464 200 A1 and does not provide for the regulation of a pulse shape.

In a preferred embodiment, the feedback control is continuous in time both during the generation of the light pulses and in dark phases between the pulses. To ensure precise operation of the feedback control during the dark phases, it is preferred that the control light source generates a minimum amount of light corresponding to a finite positive offset during the dark phase. This preferably means that between pulses in the "OFF" state, the control light source glows dimly. The continuous operation of the control loop during the dark phases can advantageously ensure that at the beginning of a new light pulse, the regulation does not exhibit overshoot. This ensures very precise and smooth regulation operation.

In a preferred embodiment, the at least one emission light source is decoupled from the feedback control via a separate switch in dark phases, so that the emission light source preferably reaches a true dark state with respect to the emitted light between the light pulses. In the embodiment, the feedback control in the dark phases is preferably performed continuously by means of a dimly glowing control light source, so that the "actual" signal for the light sources continues to be adjusted or tracked to the set signal of the function generator (minimum finite offset). However, the adjusted or tracked signal is not converted to a dimly glowing signal from the emission light source during the dark phase. Instead, the emission light source current is disconnected from the control loop via a separate switch during the dark phase. This achieves a true "dark state" with respect to the emitted light between pulses, without the control loop exhibiting overshoot at the start of the next pulse. Shortly before the start of a next light pulse, the emission light source reconnected. Preferably, in consequence the emission light source likewise operates at the minimum offset.

Advantageously, it has been shown that the disturbance to the control system caused by switching the emission light source on and off from the control loop is minimal. In particular, this achieves a true dark state without the need to truly turn off the feedback emission source between pulses. Aborting the control signal and transitioning the feedback control to an undefined state is prevented. As a result, a particularly interference-free and accurate control can be achieved.

In a preferred embodiment of the invention, the control unit is configured for readjustment of the electrical signal with a frequency of more than 10 MHz, preferably more than 50 MHz, 100 MHz. As is usual for electrical feedback mechanisms, the described regulation of the electrical signal by means of the regulating unit can advantageously be performed in the nanosecond range, so that for pulses with preferred pulse widths in the range of a few microseconds, readjustment is performed with orders of magnitude higher resolution.

In another preferred embodiment of the invention, the electrical signal from the feedback detector is amplified before being fed into the regulating unit. In preferred embodiments, a transimpedance amplifier may be used for this purpose. By amplifying the feedback signal, a higher accuracy of the regulation is achieved.

In another preferred embodiment of the invention, the device comprises, for each of the at least one emission light source, a control light source having substantially identical performance parameters, preferably in terms of emission spectrum, illuminance and/or light-current characteristics. Performance parameters preferably denote any parameters of the light sources that can characterize their emission characteristics.

To ensure that the emission behavior of the control light source reflects that of the emission light source particularly precisely, it is preferable to use light sources of identical design.

Preferably, all performance parameters or characteristics of the control or emission light source used for characterization, calibration and/or standardization should be identical. In particular, the temporal behavior with respect to a current change, i.e. the dynamic light-current characteristic of the respective control and emission light source should be identical or nearly identical. If the emission spectrum of the light is also used in the calibration of the photodetectors, it is particularly preferred that the emission spectrum of the control and emission light sources is also identical or nearly identical to such an extent that an error that could result from differences in the emission spectrum is at least one order of magnitude smaller than the desired accuracy of the calibration.

It is already known that at very low and at very high currents LEDs as light sources exhibit clearly measurable differences in the integrated light intensity. However, as long as the temporal (and spectral) behavior of control and emission LEDs is largely identical, this difference can easily be corrected, for example, by adjusting the target brightness value accordingly.

Terms such as almost, substantially, approximately, about, etc. preferably describe a tolerance range of less than ±20%, preferably less than ±10%, even more preferably less than ±5% and in particular less than ±1%. Specifications of substantially, approximately, about, approx. etc. always also disclose and include the exact value mentioned The experience of the inventors shows that light sources of identical design, for example LEDs, of one batch exhibit an exceedingly high degree of identity with regard to their temporal behavior. The presence of identical performance parameters, in particular with regard to the dynamic light-current characteristic, can be ensured by random testing or by measuring the step response of an LED or light source.

For example, the measurement of the emitted light quantity as a function of the current can be performed by control/emission light sources to be potentially used. By comparing the obtained curves, the aforementioned correction of the set signal is obtained such that the emitted light quantity corresponds to the brightness set by the user.

The spectral properties of the light sources, preferably of the LEDs, can also be easily measured with a spectrometer, so that a selection procedure for the light sources to be used during production can be implemented on the basis of said measurements. For example, a selection of spectrally compatible LEDs in pairs can be made prior to production, and manufactured LED modules can be tested and spectrally incompatible modules sorted out.

In a preferred embodiment of the invention, the device comprises two or more emission light sources, wherein the device is configured such that the two or more emission light sources couple into the light guide with a different efficiency, such that different intensity ranges for the coupled-out light pulses can be selected depending on the selective control of the two or more emission light sources.

For this purpose, different configurations can be provided. For example, it may be preferred that the emission light sources are at a different distance and/or orientation from the light guide. Further spaced emission light sources or emission light sources which do not radiate perpendicularly to the light guide will couple with a lower efficiency than is the case for close emission light sources, in particular if they also radiate perpendicularly to the light guide. Positioning both in terms of distance and/or orientation is a particularly simple way to ensure different coupling efficiencies.

However, other principles can also be applied. For example, it may be preferable to use optical filters (e.g. neutral density filters, ND filters) or an aperture for partial spatial filtering of the emitted light of the respective light sources.

By providing two or more emission light sources, preferably three or more emission light sources, which couple into the light guide with a different efficiency and which can be controlled separately, a particularly high intensity dynamic can be achieved.

The dynamics of a single light source, for example an LED, is usually limited by a noise floor, which means that arbitrarily small emission intensities are not achievable. Instead, a minimum intensity is required for meaningful generation of light pulses. The dynamic range of an LED is typically in the range of 1:500 or 1:100, i.e. by means of appropriate variation of the current intensity of the incoming electrical signal, the amplitude of the light emission can be varied by a factor of 500 at most, or in some cases only 100.

For the coupling efficiency, on the other hand, arbitrary attenuation factors can be introduced in a simple way. For example, the coupling efficiency for a first emission light source can be a factor of 100 higher than the coupling efficiency for a second emission light source. If both separate emission light sources could only cover an amplitude modulation in a range of 1:100, the dynamic range for the system of separately controllable light sources is 1:10 000. Accordingly, the second emission light source can cover a low intensity range and the first emission source can cover an intensity or amplitude range which is higher by a factor of 100.

In a preferred embodiment of the invention, the efficiency of coupling the two or more emission light sources into the optical fiber differs by at least a factor of 1:10, preferably 1:50, 1:100 or more.

In the case of three or more emission light sources, it may be preferred to provide a series of three or more emission light sources for different intensity ranges, wherein the next higher intensity range is based on an efficiency of coupling increased by the same factor. The aforementioned factor preferably corresponds to the ratio of the intensity or amplitude of the light pulses coupled into the light guide.

In a preferred embodiment of the invention, the device is characterized in that the device comprises two or more, preferably three, four, five, six or more, emission light sources and associated two or more, preferably three, four, five, six or more, control light sources having different spectral emission ranges. By providing such assignment pairs of control and emission light sources, a wide spectral range can be covered in a compact manner by means of the light sources. Since, in contrast to previous solutions in the state of the art, no direct feedback detection of the emission light sources is necessary, particularly compact arrangements can be realized.

In a preferred embodiment of the invention, the device is characterized in that the two or more, preferably three, four, five, six or more, emission light sources cover a spectral range of a width of at least 400 nm, preferably 500 nm, 600 nm or more, the spectral range preferably being comprised within an interval of 200 nm to 1500 nm, preferably 300 nm to 1200 nm, 400 nm to 900 nm.

In a preferred embodiment of the invention, the device comprises two or more, preferably three, four, five, six or more, emission light sources installed on a circuit board, wherein the two or more, preferably three, four, five, six or more, emission light sources are preferably arranged in an annular or circular shape on the circuit board. Particularly preferably, the annularly or circularly arranged emission light sources have different spectral emission ranges, for example, to cover a spectral range of a width of at least 400 nm, 500 nm, 600 nm or more.

Preferably, the two or more, preferably three, four, five, six or more, emission light sources are arranged in a circle around an axis on which the light guide is located, so that the emission light sources have an equal distance and/or orientation to the light guide and thus couple into the light guide with preferably equal efficiency.

The embodiment also enables particularly compact integration of the light sources on the circuit board. For example, it is possible to position six LEDs on a ring or circle with a diameter of less than 2 mm. For LEDs with typical dimensions of 0.5 mm, these can be positioned particularly closely on such a ring with distances of less than 0.1 mm. Hereby, the generation of light pulses with 6 colors is realized by an extremely compact design (see also FIG. 5). In addition, it may be preferable to position an emission light source in the center of a circle. For example, possible differences in brightness of different colored LEDs can be compensated by deliberately placing the darkest color or the LED with the lowest intensity at a position with the best coupling efficiency in the center of the circle.

In a preferred embodiment of the invention, the device comprises two or more, preferably three, four, five, six or more, emission light sources and an equal number of control light sources as well as feedback detectors, wherein a control light source is associated with each emission light source. The associated emission and control light sources are preferably present as light sources of identical design, for example as LEDs with identical operating parameters. If, for example, two or more, preferably three, four, five, six or more, emission light sources with different spectral emission ranges are used, it is preferred that the spectral emission range of the respective control light source corresponds to the spectral emission range of the associated emission light source.

Advantageously, the spatial arrangement of the control light sources can be selected independently of the arrangement of the emission light sources. For example, the control light sources can be installed on the same or a different circuit board. The feedback detectors can also be arranged in a spatially flexible manner, whereby a positioning for optimum illumination is preferred with respect to a respective control light source. The spatial separation of emission and control light sources thus leads to increased design flexibility, which combines highly efficient feedback control with an extremely compact design, especially when several emission light sources are provided.

In another preferred embodiment of the invention, the device comprises two or more emission groups of two or more, preferably three, four, five, six or more, emission light sources with different spectral emission ranges, wherein the two or more emission groups are present positioned such that they couple into the optical fiber with different efficiencies. In the embodiment, light pulses with different spectral ranges can thus be generated for different intensity levels. The embodiment is therefore not only characterized by high dynamics, but moreover by the possibility of controlling a wide spectral range by means of the light sources.

In a preferred embodiment of the invention, two or more emission groups are arranged on circuit boards which are positioned consecutively along the emission direction and which each exhibit an aperture for light transmission in the emission direction of an emission group situated upstream, so that the coupling of a front emission group is reduced by the partial shielding of a downstream circuit board behind the front emission group.

The emission groups are preferably, as explained above, a group of two, three, four, five, six or more emission light sources with different spectral emission ranges, which are particularly preferably arranged in a circle on a circuit board. By positioning the emission groups consecutively one behind the other and taking advantage of the partial shielding of boards in front of them, the respective emission groups can be used for different intensity ranges. To vary the efficiency of coupling for the different emission groups, each board preferably exhibits an aperture, i.e. an opening. The size of the aperture determines the efficiency with which an emission light source positioned in front of the circuit board on the input side couples into the light guide on the output side.

Figure 6:
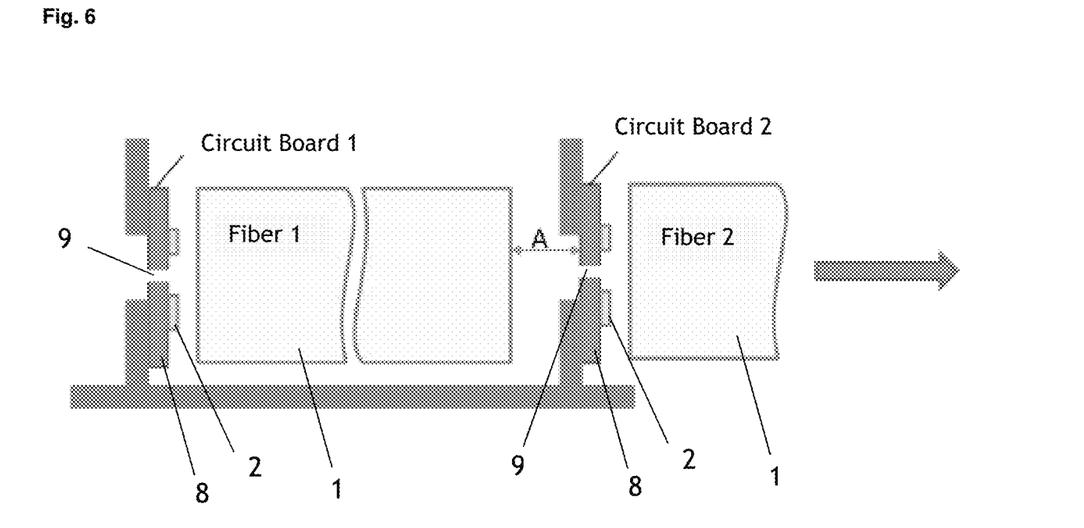
FIG. 6 schematically illustrates an arrangement of several emission groups with multicolor light sources representing different intensity levels.

In a preferred embodiment, the emission groups can be arranged in a circle on circuit boards with central axial apertures, whereby an optical fiber allows light to be conducted from an emission group on the input side to the next emission group on the output side (cf. FIG. 6). Output side preferably denotes the part of the device at which the optical fiber is present for conducting the light pulses to a flow cytometer or microscope. The input side refers to the opposite direction. Emission groups that are in front in the direction of emission can also be referred to as input-side emission groups. Emission groups which are present in the vicinity of the light guide for coupling out are also referred to as emission groups behind or on the output side.

The coupling efficiency may depend on the size of the aperture or the fiber spacing of the connecting optical fibers to the outcoupling optical fiber.

In a preferred embodiment of the invention, the efficiency of coupling the two or more emission groups into the optical fiber differs by at least a factor of 1:10, preferably 1:50, 1:100. For cases of the above described emission groups arranged in a circle on circuit boards with apertures, which are present in series, a person skilled in the art may ensure corresponding factors by adjusting the diameter of the aperture or alternatively the spacing of the optical fibers feeding onto the aperture.

In a further aspect, the invention furthermore relates to the use of the device described herein for characterization, standardization and/or calibration of photodetectors, preferably within a flow cytometer and/or a microscope.

For the purposes of the invention, the term photodetector preferably has the meaning customary in the art and refers to sensors for quantifying electromagnetic radiation, preferably in the visible range, although detection of electromagnetic radiation in the ultraviolet or infrared range may also be preferred. The term photodetectors may include detectors whose operation is based on the external photoelectric effect, such as photocells or photomulitpliers (PMTs). Likewise, photodetectors that use the internal photoelectric effect may also be characterized or calibrated by means of the device. These include, for example, CMOS sensors, CCD sensors, photodiodes avalanche photodiodes, pin photodiodes or phototransistors.

However, as explained above, the device is particularly suitable for the characterization, standardization and/or calibration of photomulitpliers (PMTs), whereby the precise generation of the light pulses enables to comprehensively characterize the dynamic range (DNR) and the signal-to-noise ratio (SNR) on the basis of statistic laws (cf. Steen 1992), The signal-to-noise ratio (SNR) preferably represents a measure that compares the level of a desired signal with the level of a background signal. To determine the SNR, therefore, a characterization of the dark noise is preferably also provided. The dynamic detection range (DNR), preferably represents a measure that compares the levels of the minimum detectable signal and the maximum detectable signal.

By determining the dependence of SNR and DNR on a detector voltage, for example a PMT gain, an optimal working range can advantageously be set (cf. Gieseke et al. Cytometry Part A 91A: 1104-1114, 2017). For this purpose, SNR and DNR curves can be generated and evaluated over a PMT voltage range from 400 V to 1,000 V, for example, using SNR and DNR curves. In general, as the PMT gain is increased, the SNR will initially grow while the DNR remains constant. With further increases, once a threshold value (DNR) for the PMT gain is reached, there will be a drop in DNR. Similarly, the SNR does not increase continuously, but reaches a plateau above a threshold value (SNR). The optimal working range will lie between the two threshold values. Below the working range, the SNR is suboptimal. Above the working range, the SNR stagnates at the maximum, with an increase in PMT-gain only leading to a decrease in DNR.

Furthermore, the precise generation of light pulses by means of the device allows, i.a. a calibration of the intensity scales of photodetectors to determine absolute units (cf. Steen et al. 1992 and above). For the case of fluorescent proteins, knowledge of absolute units allows conclusions to be drawn about the actual concentration of proteins. In addition, an absolute intensity calibration allows for a meaningful quantitative comparison of experimental data recorded with different instruments. For example, it may be preferable to sort fluorescent cells using a flow cytometer and then examine the sorted cells in a microscope. Different photodetectors are used in the flow cytometer and microscope and their signals are not easily comparable. Calibration to determine absolute units, on the other hand, allows the cells in the microscope to be assigned to data from the flow cytometer and vice versa.

In a preferred embodiment, the invention further relates to a use for a calibration of the intensity scales of the photodetectors to determine absolute units, a characterization of the photodetectors, for example with respect to their dark noise, signal-to-noise ratio (SNR) or dynamic range (DNR), and/or an optimization of operating parameters of photodetectors, for example the voltage or amplifier setting in the case of a photomultiplier (PMT).

Photodetectors, in particular PMTs, are used as standard in flow cytometers as well as optical microscopes and are characterized by a particularly high sensitivity, which detects even low signals quick and reliable.

The characterization, standardization and/or calibration of photodetectors is thus of particular importance for controlling and improving the performance of flow cytometers or microscopes.

In a further aspect, therefore, the invention also relates to a system comprising a. A flow cytometer or microscope and b. A device described herein for generating light pulses for characterization, standardization and/or calibration of the flow cytometer or microscope.

Flow cytometer refers to an instrument commonly used in the prior art to perform a flow cytometry measurement. Typically, a flow cytometer comprises a reservoir for a fluid and particles, a fluid nozzle configured to generate a fluid stream comprising the particles, a light source configured to generate a light beam that illuminates the fluid stream comprising the particles, a photodetector, preferably a PMT, configured to detect the emitted light from the particles, and optionally a processing unit for evaluating the detected light.

In a further aspect, the invention moreover relates to a kit comprising.

a. A device described herein b. A computer program configured to perform a method of characterization, standardization and/or calibration of a flow cytometer or microscope using the device c. Optionally, instructions and/or means for connecting the device to a flow cytometer or microscope.

The skilled person will recognize that preferred embodiments and advantages disclosed in connection with the device for generating light pulses for characterization, standardization and/or calibration of photodetectors apply equally to the claimed use or system and kit. In particular, the preferred embodiments apply equally to the device, its use, the system, and the kit.

Figure 1:
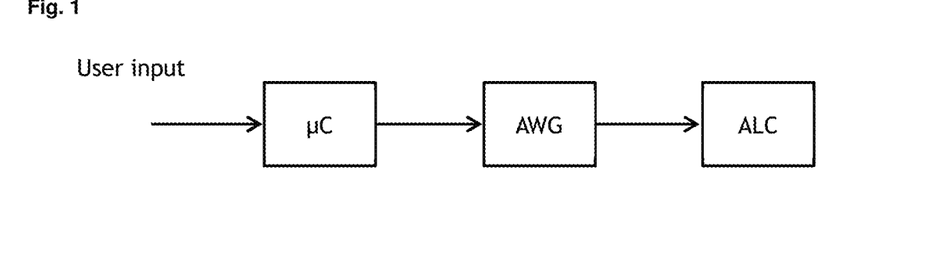
FIG. 1 shows a block diagram of individual components of the device for generating light pulses.

FIG. 1 shows a block diagram of individual components of the device for generating light pulses. A microprocessor is used for further processing of a user input with regard to a desired light pulse shape. The determined information or specifications regarding the waveform or signal shape are forwarded to an arbitrary function generator, which generates an electrical signal with the corresponding waveform. The electrical signal is passed on to a analog-to-light unit, which converts the electrical signal into light pulses.

Figure 2:
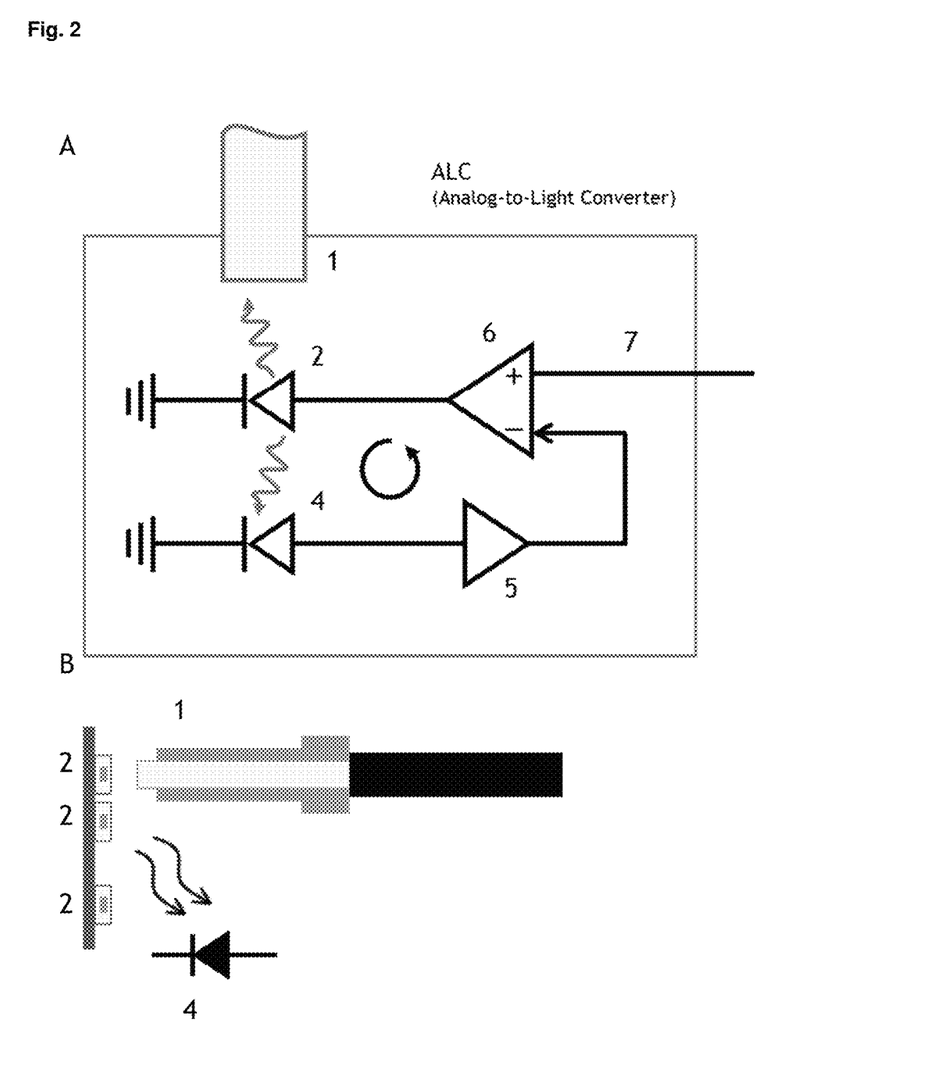
FIG. 2 shows a schematic illustration of the implementation of a feedback control system according to the prior art.

FIG. 2 shows a schematic illustration of the implementation of a feedback control according to the prior art, for example the well-known quantiFlash calibration product.

As can be seen in FIG. 2A, an electrical signal is transferred from the function generator to the analog-to-light converter according to the predetermined or specified waveform (set or target signal 7). The electrical signal flows through the emission light source 2 and results in the generation of light pulses. A feedback detector 4 is positioned to detect the light emitted by the emission light source 2. The electrical feedback signal is amplified by means of a transimpedance amplifier 5 and passed to a regulating unit 6. The regulating unit 6 is formed by an electric circuit which compares the desired signal 7 with the feedback signal from the feedback detector 4 and regulates the current through the emission sources in such a way that the difference of both signals is zero. Hereby the actual signal of the emission light source 2 is readjusted or tracked to the set or target signal 7 of the function generator.

FIG. 2B illustrates an arrangement of the emission light source 2 for covering a wide intensity range and increased dynamic range. For this purpose, three emission light sources 2 are provided, which couple into the same output fiber or light guide 1 with different efficiencies based on their relative positioning to the output fiber or light guide 1. The upper emission light source 2, which is close to the light guide 1, will couple into the light guide 1 with the highest efficiency and can cover a range of high pulse intensities. In contrast, the emission light source 2, which is positioned more distant from the light guide 1, couples into it only with reduced effectiveness, so that it corresponds to a lower intensity level. The positioning of the emission light sources 2 at different distances from the light guide 1 thus allows the setting of different intensity levels. The feedback detector 4 is positioned in such a way that light from each of the three emission light sources 2 radiates at least partially onto the feedback detector 4.

However, the illumination of the feedback detector 4 by the different emission light sources 2 varies, so that the irradiation cannot be optimal for all emission light sources 2 and, moreover, an individual adjustment of the feedback regulation is necessary.

Figure 3:
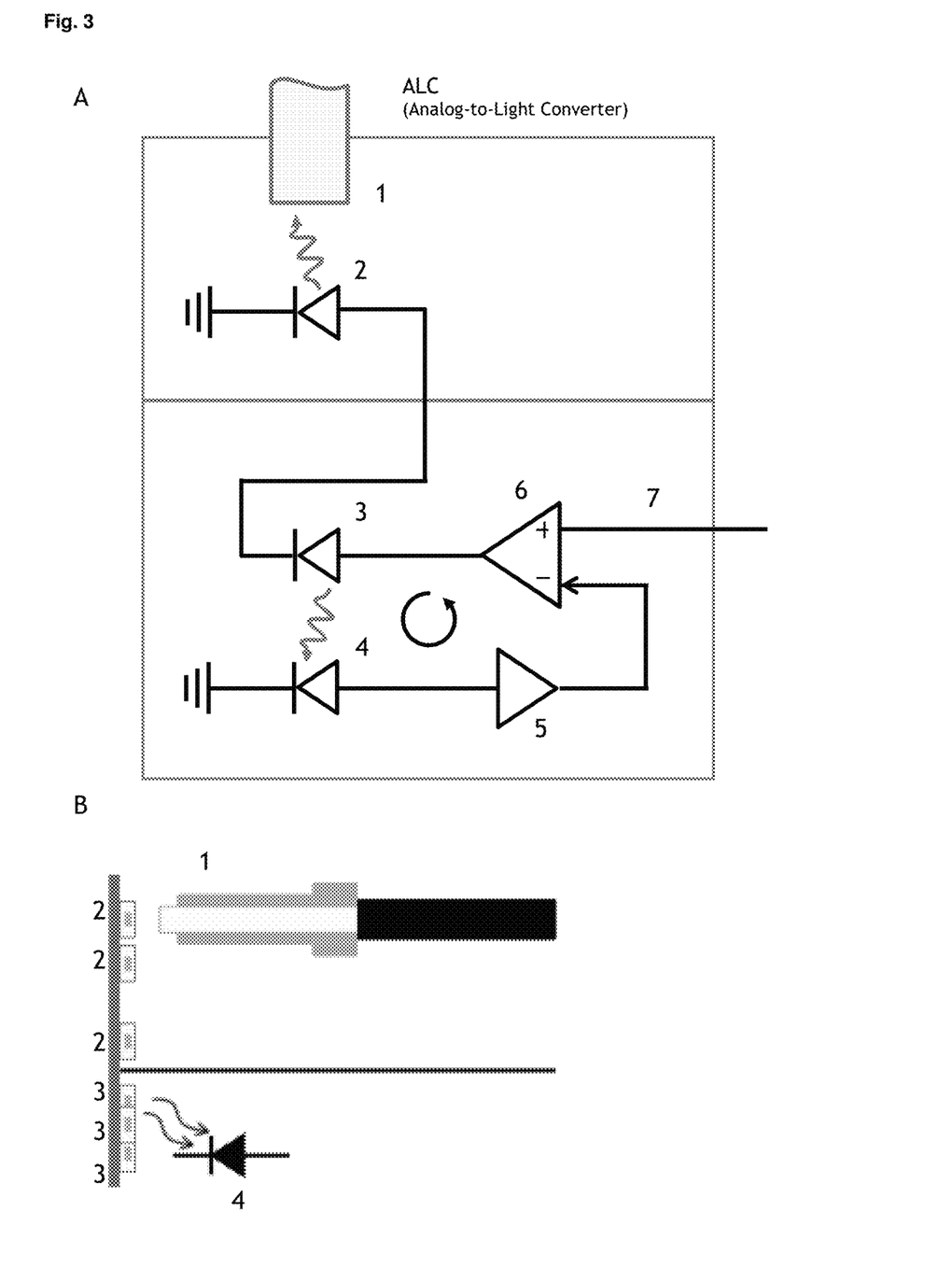
FIG. 3 shows a schematic illustration of a preferred embodiment of a feedback control system according to the invention.

FIG. 3 shows a schematic illustration of a preferred embodiment of a feedback control system according to the invention.

The basic principle is similar to the feedback regulation shown in FIG. 2A. An electrical signal according to the predetermined waveform or signal form (set or target signal 7) is transferred from the function generator to the analog-to-light converter, passes through the emission light source 2 to generate light pulses, and is readjusted using a feedback detector 4. Deviating from the principle of the prior art, however, the feedback detector 4 does not directly detect the light pulses of the emission light source 2. Instead, the device comprises a separate control light source 3. Emission light source 2 and control light source 3 are connected in series, so that both are operated by the same electrical signal synchronously to emit light pulses. The feedback detector 4 is positioned to detect the light emitted by the control light source 3.

The electrical feedback signal is in turn amplified by means of a transimpedance amplifier 5 and passed to a regulating unit 6. The regulating unit 6 is formed by an electrical circuit which compares the target or set signal 7 with the feedback signal from the feedback detector 4 and regulates the current through both the emission light source 2 and the control light source 3 sources such that the difference between the two signals is zero.

The regulating unit 6 immediately performs a continuous readjustment of the electrical signal based on the emission of the control light source 3 measured by the feedback detector. Due to the series connection, the emission behavior of the control light source 3 is advantageously identical or almost identical to the emission behavior of the emission light source 2, so that the actual signal of the emission light source 2 is also adjusted to the set or target signal 7 by said regulation. The spatial separation of emission and control light source leads to increased design flexibility and a number of advantages.

FIG. 3B shows, analogous to FIG. 2B, an arrangement of emission light sources 2 for covering different intensity ranges. Here, three emission light sources 2 couple into the light guide 2 with different efficiencies based on their relative positioning. The different positioning and consequently the degree of efficiency of the coupling into the light guide 1, allows the setting of different intensity levels. In the embodiment shown, the upper emission light source 2 corresponds to the highest intensity level and the lower emission light source 2 corresponds to the lowest intensity level. Advantageously, however, the control light sources 3 can be optimally aligned with the feedback detector 4 independently of this. Compact positioning of the control light sources 3 in relation to the feedback detector 4 ensures optimum illumination and allows to dispense for an individual adjustment of the feedback regulation for individual pairs of emission and control light sources.

Figure 4:
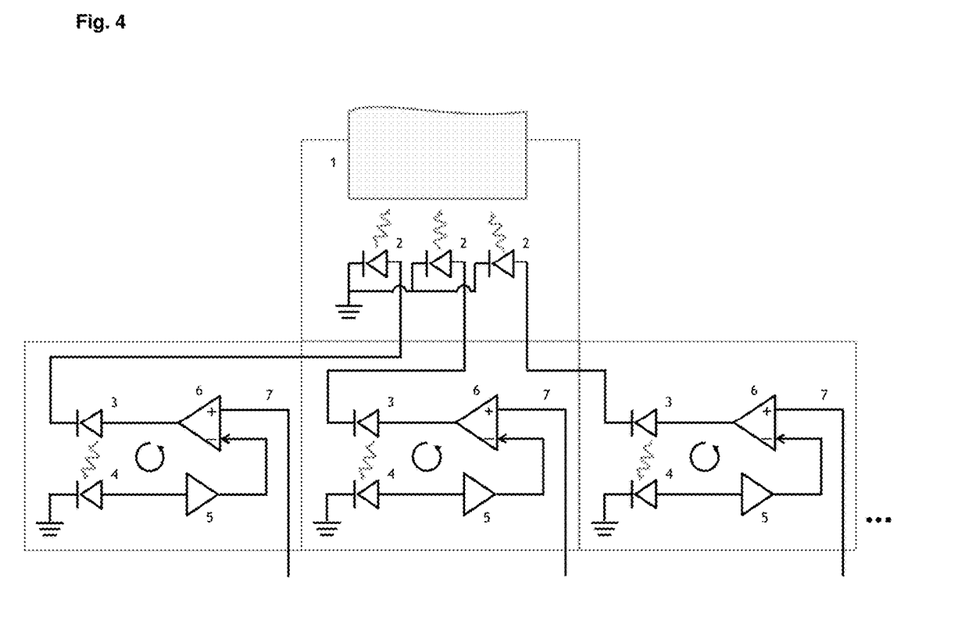
FIG. 4 shows a schematic illustration of a preferred embodiment of the device for providing light pulses with different spectral emission.

FIG. 4 shows a schematic illustration of a preferred embodiment of the device for providing light pulses with different spectral emission. Herein, three or more emission light sources 2 with different emission spectra are aligned with respect to a light guide 1. Each of the three (or more) emission light sources 2 is associated with three (or correspondingly more) control light sources 3, which radiate on three (or more) feedback detectors 4, respectively. Feedback regulation is performed by means of a regulating unit 6 using the principle described above for matching a target signal 7 to the feedback signal of the feedback detectors 4. The provision of separate control light sources 3 permits an extremely compact arrangement of the emission light sources 2, as can be appreciated in the preferred embodiment shown in FIG. 5.

Figure 5:
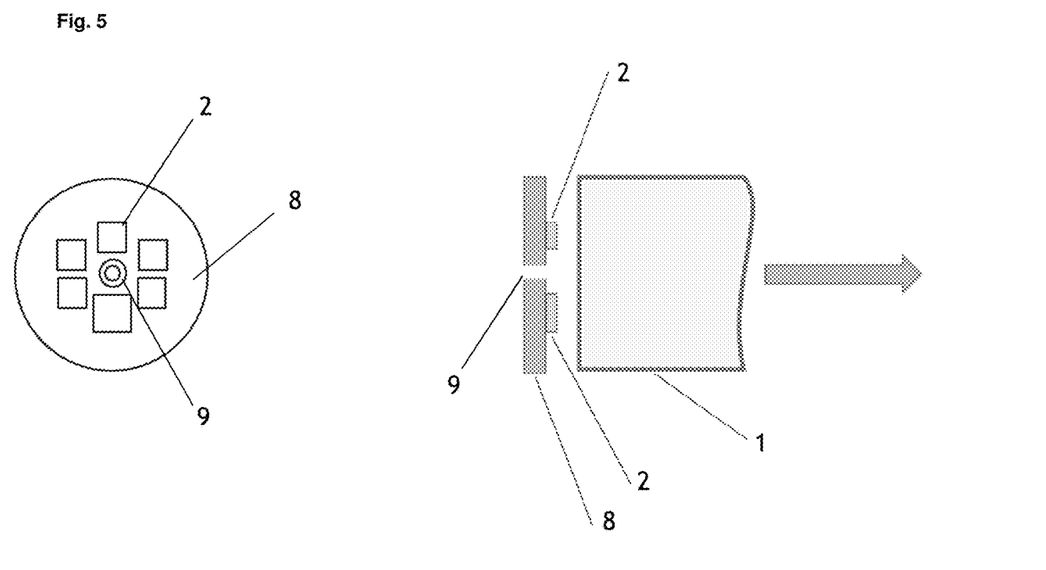
FIG. 5 shows a schematic diagram of a preferred circuit board on which emission light sources are arranged in a circle (A: top view; B: side view).

FIG. 5 shows a schematic representation of a preferred circuit board on which emission light sources 2 are arranged in a circle (A: top view; B: side view). The arrangement allows for a close integration of emission light sources 2 on one circuit board. As shown, it is possible to position six emission light sources 2 (for example LEDs) on a ring or circle whose diameter is less than 2 mm. For LEDs with typical dimensions of 0.5 mm, these can be arranged on such a ring particularly closely with distances of less than 0.1 mm. By aligning the center of the ring with the light guide 1, the emission light sources 2 have equal spacing and orientation with respect to the light guide 1 and couple into it with equal efficiency. In the center of the circuit board 8, it may be preferable to arrange an aperture 9 so that several emission groups can be arranged consecutively in series (cf. FIG. 5). Likewise, in other embodiments (not shown), it may be preferred to use an emission light source 2 in the center of the circle to deliberately compensate for differences in brightness of different emission light sources 2 (for example LEDs).

FIG. 6 schematically illustrates an arrangement of several emission groups with multicolor light sources representing different intensity levels. The emission groups are preferably a group as shown in FIG. 5 with several emission light sources 2 with different spectral emission ranges, which are arranged in a ring or circle on a printed circuit board 8. By positioning the emission groups one behind the other and utilizing the partial shielding of the printed circuit boards 8 in front of them, the respective emission groups can be used for different intensity levels.

To vary the efficiency of coupling for the different emission groups, both the first and second printed circuit boards have an aperture 9. An optical fiber 1 guides the light from the input (left) emission group of the first printed circuit board 8 to the output (right) emission group of the second printed circuit board 8. The efficiency of the coupling of the first emission group can be adjusted by the size of the aperture 9 in the second printed circuit board 8, as well as by the fiber distance A to the outcoupling optical fiber 1.

It is noted that various alternatives to the described embodiments of the invention may be used to carry out the invention and arrive at the solution according to the invention. Thus, the device, system or kit according to the invention, as well as the use thereof, are not limited in their embodiments to the foregoing preferred embodiments. Rather, a large number of embodiments are conceivable, which may deviate from the solution presented. The aim of the claims is to define the scope of protection of the invention. The scope of protection of the claims is directed to covering the device, the system or kit according to the invention or their uses as well as equivalent embodiments thereof.

LIST OF REFERENCE SIGNS

1 Light guide (fiber)
2 Emission light source, especially emission LED
3 Control light source, especially control LED
4 Feedback detector, especially feedback photodiode
5 Transimpedance amplifier
6 Regulating unit, in particular regulator or controller 7 Waveform (signal form) predetermined by function generator as set signal (target signal)
8 Board (circuit board)
9 Aperture

The invention claimed is:

1. A device comprising:
   a) a control unit
   b) at least one emission light source and
   c) a light guide,
   wherein the control unit is configured to generate an electrical signal having a predetermined waveform by means of which the at least one emission light source is controlled to generate light pulses from the at least one emission light source, and the at least one emission light source is positioned for coupling the light pulses into the light guide
   characterized in that
   the device comprises at least one feedback detector and at least one control light source, wherein the at least one control light source is present in series connection with the at least one emission light source, so that the at least one control light source is controlled by means of the same electrical signal for generating light pulses from the at least one emission light source, wherein the electrical signal comprises electrical pulses having a pulse width from 0.1 µs to 100 µs, and a repetition rate from 0.1 to 100 kHz and wherein the at least one control light source is present positioned in such a way that the light pulses from the control light source actually generated by the at least one control light source are not coupled into the light guide, but are detected by the at least one feedback detector and transmitted to a regulating unit which is configured for a readjustment of the electrical signal.

2. The device according to claim 1,
   characterized in that
   the at least one emission light source and the at least one control light source are light emitting diodes (LEDs) and/or the feedback detector is a photodiode.

3. The device according to claim 1,
   characterized in that
   the control unit comprises a microprocessor, and a function generator.

4. The device according to claim 1,
   characterized in that
   the control unit comprises input means for determining parameters of the light pulses from the at least one emission light source and or control light source to be generated and a data processing unit is configured to control a function generator for generating an electrical signal on a basis of predetermined parameters.

5. The device according to claim 1,
   characterized in that
   the predetermined waveform comprises electrical pulses having a Gaussian shape or a flat-top pulse shape.

6. The device according to claim 1,
   characterized in that
   the regulating unit is configured for readjustment of the electrical signal with a frequency of more than 10 MHz.

7. The device according to claim 1
   characterized in that
   the device comprises, for each of the at least one emission light source, and one of the at least one control light source having substantially identical performance parameters.

8. The device according to claim 1,
   characterized in that
   the device comprises two or more emission light sources, the device being configured in such a way that the two or more emission light sources couple into the light guide with a different efficiency, so that, depending on a selective control of the two or more emission light sources, different intensity ranges for coupled-out light pulses can be selected.

9. The device according to claim 1,
   characterized in that
   the device comprises two or more emission light sources and associated two or more control light sources having different spectral emission ranges, wherein the two or more emission light sources cover a spectral range of a width of at least 400 nm, wherein the spectral range comprises an interval of 200 nm to 1500 nm.

10. The device according to claim 9,
    characterized in that
    the two or more emission light sources are present installed on a circuit board, wherein the two or more emission light sources are arranged circularly on said circuit board.

11. The device according to claim 1,
    characterized in that
    the device comprises two or more emission groups of two or more emission light sources with different spectral emission ranges, wherein the two or more emission groups are positioned such that they couple into the light guide with a different efficiency, wherein the two or more emission groups are arranged on circuit boards which are positioned consecutively along the emission direction and which each exhibit an aperture for a light passage in the emission direction of an emission group situated upstream, so that the coupling of a front emission group is reduced by the partial shielding of a downstream circuit board situated behind the front emission group.

12. A kit comprising:
    a. the device according to claim 1, and
    b. instructions for connecting the device to the flow cytometer or microscope.

13. The kit according to claim 12,
    wherein the light guide is configured for connecting the device to the flow cytometer or microscope.

14. A device comprising:
    a) a control unit
    b) at least one emission light source and
    c) a light guide,
    wherein the control unit is configured to generate an electrical signal having a predetermined waveform by means of which the at least one emission light source is controlled to generate light pulses from the at least one emission light source, and the at least one emission light source is positioned for coupling the light pulses into the light guide
    characterized in that
    the device comprises at least one feedback detector and at least one control light source, wherein the at least one control light source is present in series connection with the at least one emission light source, so that the at least one control light source is controlled by means of the same electrical signal for generating light pulses from the at least one emission light source, and wherein the at least one control light source is present positioned in such a way that the light pulses by the at least one control light source are not coupled into the light guide, but are detected by the feedback detector and transmitted to a regulating unit which is configured for a readjustment of the electrical signal, wherein the regulating unit is configured for readjustment of the electrical signal with a frequency of more than 10 MHz.

15. A device comprising:
a) a control unit
b) at least one emission light source and
c) a light guide,
wherein the control unit is configured to generate an electrical signal having a predetermined waveform by means of which the at least one emission light source is controlled to generate light pulses from at least one emission light source, and the at least one emission light source is positioned for coupling the light pulses into the light guide
characterized in that
the device comprises at least one feedback detector and at least one control light source, wherein the at least one control light source is present in series connection with the at least one emission light source, so that the at least one control light source is controlled by means of the same electrical signal for generating light pulses from at least one emission light source, and wherein the at least one control light source is present positioned in such a way that the light pulses actually generated by the at least one control light source are not coupled into the light guide, but are detected by the feedback detector and transmitted to a regulating unit which is configured for a readjustment of the electrical signal,
wherein the device further comprises two or more emission light sources and associated two or more control light sources having different spectral emission ranges, wherein the two or more emission light sources cover a spectral range of a width of at least 400 nm, wherein the spectral range comprises an interval of 200 nm to 1500 nm.

16. A device comprising:
a) a control unit
b) at least one emission light source and
c) a light guide,
wherein the control unit is configured to generate an electrical signal having a predetermined waveform by means of which the at least one emission light source is controlled to generate light pulses from the at least one emission light source, and the at least one emission light source is positioned for coupling the light pulses into the light guide
characterized in that
the device comprises at least one feedback detector and at least one control light source, wherein the at least one control light source is present in series connection with the at least one emission light source, so that the at least one control light source is controlled by means of the same electrical signal for generating light pulses from at least one emission light source, and wherein the at least one control light source is present positioned in such a way that the light pulses actually generated by the at least one control light source are not coupled into the light guide, but are detected by the feedback detector and transmitted to a regulating unit which is configured for a readjustment of the electrical signal,
wherein the device further comprises two or more emission groups of two or more emission light sources with different spectral emission ranges, wherein the two or more emission groups are positioned such that they couple into the light guide with a different efficiency,
wherein the two or more emission groups are arranged on circuit boards which are positioned consecutively along the emission direction and which each exhibit an aperture for a light passage in the emission direction of an emission group situated upstream, so that the coupling of a front emission group is reduced by the partial shielding of a downstream circuit board situated behind the front emission group.

* * * * *